United States Patent [19]

Panster et al.

[11] Patent Number: 5,061,773

[45] Date of Patent: Oct. 29, 1991

[54] AMINOALKYL-SUBSTITUTED ORGANOPOLYSILOXANE THIOUREA DERIVATIVES AND METHODS OF PREPARATION AND USE THEREOF

[75] Inventors: Peter Panster, Rodenbach; Ulrich Deschler, Brasschaat; Peter Kleinschmit, Hanau, all of Fed. Rep. of Germany

[73] Assignee: Degussa Aktiengesellschaft, Frankfurt am Main, Fed. Rep. of Germany

[21] Appl. No.: 558,867

[22] Filed: Jul. 30, 1990

[30] Foreign Application Priority Data

Jul. 31, 1989 [DE] Fed. Rep. of Germany ....... 3925358

[51] Int. Cl.$^5$ ............................................ C08G 79/00
[52] U.S. Cl. ......................................... 528/9; 528/30;
528/39; 528/12; 528/21; 528/18; 528/23
[58] Field of Search .................. 528/30, 39, 9, 12, 21, 528/18, 23

[56] References Cited

U.S. PATENT DOCUMENTS

| | | | |
|---|---|---|---|
| 3,362,978 | 1/1968 | Kanner | 528/39 |
| 3,878,168 | 4/1975 | Schank | 528/30 |
| 4,851,492 | 7/1989 | Panster et al. | 528/31 |
| 4,954,599 | 9/1990 | Panster et al. | 528/39 |

Primary Examiner—Melvyn I. Marquis
Assistant Examiner—Margaret W. Glass
Attorney, Agent, or Firm—Beveridge, DeGrandi & Weilacher

[57] ABSTRACT

Aminoalkyl-substituted organopolysiloxane thioureas are disclosed which consist of the units

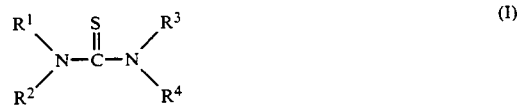

(I)

whereby
R$^1$ stands for a group

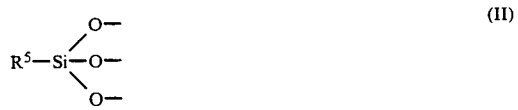

(II)

R$^5$ is an alkylene grouping, R$^2$ is equal to R$^1$ or H, R$^3$ is equal to R$^1$ or H or a group (CH$_2$)$_n$—N(R$^6$)$_2$ (III) (in which n=1-6, R$^6$=H or an alkyl group with C$_1$-C$_5$) and R$^4$=H or a group of the formula (III), whereby (I) contains at most 2 (III) groups and at most 2 (III) groups and the free valances of the oxygen atoms sitting on the silicon atom are saturated by silicon atoms of other (III) groups, optionally with the insertion of cross-linking agents containing Si, Ti or Zr. The compounds can be random copolycondensates, block copolycondensates or mixed copolycondensates in relation to the optionally present cross-linking agents. In addition, various methods of preparing the compounds are indicated. The compounds can be used especially for the removal of dissolved metals from aqueous or organic phases.

14 Claims, No Drawings

AMINOALKYL-SUBSTITUTED ORGANOPOLYSILOXANE THIOUREA DERIVATIVES AND METHODS OF PREPARATION AND USE THEREOF

BACKGROUND AND INTRODUCTION

The present invention relates to new aminoalkyl-substituted organopolysiloxane thioureas which are insoluble in water and organic solvents and are used as selective metal absorbers. The new functional polymers can be used to separate metals present in highly diluted condition from aqueous and organic solvents. Areas in which these qualities can be used advantageously are especially the primary recovery of, as well as the recycling of, noble and base metals from waste water. In further aspects, the present invention relates to methods of preparing and using the new products.

Insoluble polymeric reagents are used advantageously in chemical or pharmaceutical synthesis, in the area of biotechnology, in hydrometallurgy or in water purification, for example as ion exchangers, catalysts, catalytic carriers, enzyme carriers, metal absorbers, and the like. Examples of this are described inter alia in Chem. Rev., vol. 31, p. 557 (1981), in Ann. Rep. Prog. Chem., Sect. B 83, p. 282 (1986), publ. (1987) or also in EP-OS 0 201 286.

The polymers known in the art are frequently based on organic polymeric systems which do not, in a number of instances, meet the requirements placed on them as regards thermal and mechanical stability, inertness to chemical attacks, insolubility and accessibility of the functional groups. The use of inorganic polymeric systems such as for example, silica gel as carrier for functional groups does avoid for the most part the above-mentioned disadvantages but offers only the possibility of a relative low ability to be functionalized (cf. DE-OS 24 33 409).

According to a new concept of the hydrolysis and polycondensation of suitable organofunctional silanes, organofunctional polysiloxanes can be obtained in the meantime which exhibit a high functionality on the one hand and on the other hand the advantageous physical qualities of inorganic polymer systems. Such polymer systems have already been described in Angewandte Chemie [Applied Chemistry] vol. 98, p. 237 (1986).

SUMMARY OF THE INVENTION

The invention had the objects of enlarging the palette of the previously available organopolysiloxanes and of making new derivatives available which comprise a substituted thiourea group as functional group and which can be used in particular as selective metal absorbers.

One feature of the invention resides in new organopolysiloxanes which are:

aminoalkyl-substituted organopolysiloxane thioureas composed of units of the formula

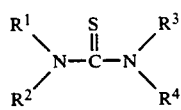  (I)

wherein

R' stands for a group of the formula

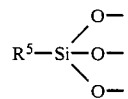  (II)

in which $R^5$ is an alkylene group with 1 to 10 C atoms or a cycloalkylene group with 5 to 8 C atoms or a group of the formula:

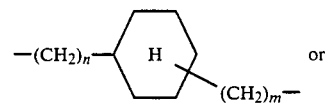

or

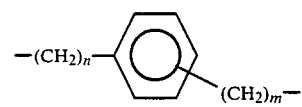

with n=1-6 (bonded to the nitrogen)
m=0-6 (bonded to the silicon),
wherein
$R^2$ has the same meaning as $R^1$ or stands for H, $R^3$ has the same meaning as $R^1$ or stands for H or a group $(CH_2)_n-N(R^6)_2$  (III)

in which n=1-6 and $R^6$ is equal to H or signifies a linear or branched alkyl group with 1 to 5 C atoms,
$R^4$ stands for H or a group of the formula (III),
and at most 2 groups of formula (II) and at most 2 groups of formula (III) are contained in the polymer unit according to formula (I), and the free valences of the oxygen atoms bound to the silicon atom are saturated as in silica skeletons by silicon atoms of further groups of formula (II) and/or via the metal atoms in one or more cross-linking bridge-type cross links:

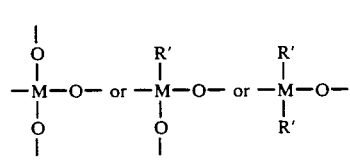  (IV)

or

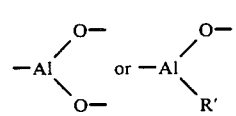  (IV)

wherein

M is a silicon, titanium or zirconium atom and R' a phenyl group or a linear or branched alkyl group with 1 to 5 C atoms and the ratio of the silicon atoms from the groups of formula (II) to the metal atoms in the bridge-type cross links of formula (IV) is 1:0 to 1:20.

In a more detailed aspect of the invention, the aminoalkyl-substituted organopolysiloxane thioureas as described above are present, relative to the optionally present cross-linking agents, as so-called random copolycondensates, block copolycondensates or as mixed copolycondensates.

Preferably, formula (II) represents a group of the formula:

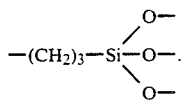

The monomeric precursors of the polymeric aminoalkyl-substituted thioureas are primarily basically known compounds. Such monomers are e.g.

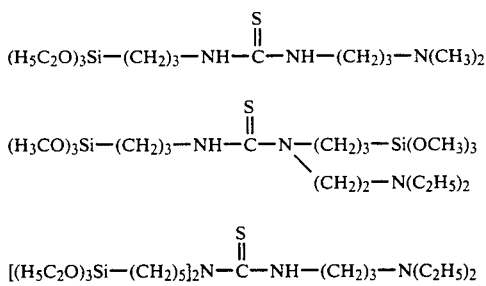

(N,N'-disubstituted and N,N,N'-/N,N',N'-trisubstituted organyloxysilyl-functional thioureas which exhibit a tertiary amino function in addition are described in German patent application P 3925356.2 corresponding to U.S. application Ser. No. 556,544 filed July 24, 1990 as regards substance and possibilities of preparation. This related application is incorporated by reference.

The composition of the polymer units which can be prepared therefrom can be described by the formulas

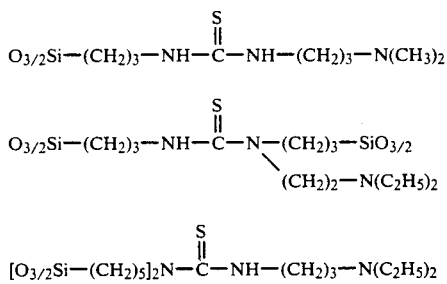

In the case of the preparation of so-called cross-linked derivatives, they can naturally be present in different forms, even if there is no difference as regards the chemical composition.

On the one hand, the groups according to formula I and formula IV can be present adjacent to each other distributed in a purely random manner or they can be present in the form of blocks or also both in the form of blocks and also adjacent to each other distributed in a random manner.

Each of these possible forms can be obtained according to a further feature of this invention which resides in the method of preparing aminoalkyl-substituted organopolysiloxane thioureas as described above by dissolving in a solvent a monomeric aminoalkyl-substituted thiourea of the formula:

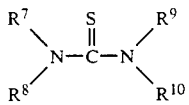

in which
R$^7$ stands for a group of the general formula $$R^5-Si(OR^{11})_3 \qquad (VI)$$

and
R$^5$ has the same meaning as in formula (II) above,
R$^{11}$ stands for a linear or branched alkyl group with 1 to 5 C atoms,
R$^5$ has the same meaning as R$^7$ or stands for H,
R$^9$ has the same meaning as R$^7$ or stands for H or a group of the formula (III) above,
R$^{10}$ stands for H or a group of formula (III) above, and at the 2 groups of formula (VI) and at most 2 groups of formula (III) above are contained in the monomeric thiourea of formula (V), Optionally, the dissolution is carried out after the addition of one or more cross-linking agents of the genera formula:

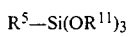

in which
M is a silicon, titanium, zirconium or aluminum atom,
R' a linear or branched alkyl group with 1 to 5 C atoms or a phenyl group and R signifies a linear or branched alkyl group with 1 to 5 C atoms, whereby the ratio of the silicon atoms of the groups of the general formula (VI) to the metal atoms of formula (VII) is 1:0 to 1:20.

The solvent used is one that is largely water-miscible but dissolves the substituted thiourea of formula (V) and cross-linking agents according to formula (VII).

An amount of water is added to the resulting solution under agitation which is at least sufficient for the complete hydrolysis and condensation. The reaction mixture obtained thereby is gelled under further agitation at a definite temperature in the range of room temperature to 200° C. The solid which forms during the reaction is agitated further, optionally after the addition of more solvent or water, up to 48 hours at room temperature up to 200° C. at normal pressure or a pressure corresponding to the sum of the partial pressures at the particular temperature. Then the resulting polycondensate is separated from the liquid phase according to conventional techniques, is optionally washed, and dried at room temperature to 250° C. The drying can be carried out under an atmosphere of protective gas if desired or in a vacuum. The resulting product is then optionally tempered 1 to 100 hours at temperatures of 130° C. to 300° C. in air, under an atmosphere of protective gas or in a vacuum, and can then be optionally ground and/or classified.

Suitable solvents useful for the above are organic solvents, especially lower alkanols such as methanol, ethanol, n- and i-propanol, n- and i-butanol, and n-pentanol. These can be used alone or in a mixture as solvent in the hydrolysis reaction.

Especially good results can be obtained if the hydrolysis is carried out with an excess of water.

In a variation of the process described above crosslinked organopolysiloxane thioureas can be prepared by precondensing the monomer according to formula (V) and the cross-linking agent or agents according to formula (VII) with or without an organic solvent in the presence of an amount of water which is not sufficient for the complete hydrolysis within the set precondensation time period, preferably in the presence of 1 to 100 mole % of the amount required for this, over a time period of 5 min. to 72 hours at room temperature to 200° C. Optionally, a condensation catalyst can be added to the reaction system. After the addition of more water and, optionally, more solvent, the method proceeds further as described above.

As a further variation, the cross-linked organopolysiloxane thioureas can be prepared by independently precondensing the monomeric component according to formula (V) and the cross-linking agent or agents according to formula (VII) for 5 min. to 72 hours with or without an organic solvent in the presence of an amount of water which is not sufficient for the complete hydrolysis within the set precondensation time period. Preferably the amount of water is 1 to 100 mole % of the amount required for incomplete hydrolysis. The reaction is typically carried out at room temperature to 200° C., optionally under the addition of a condensation catalyst, the precondensed components are subsequently combined and then, after the addition of more water and, optionally more solvent, the method proceeds further as described above.

A still further variation of the process described above resides in preparing cross-linked organopolysiloxane thioureas as described above by precondensing either the monomeric component according to formula (V) or the cross-linking agent or agents according to formula (VII), with or without using an organic solvent in the presence of an amount of water which is not sufficient for the complete hydrolysis within the set precondensation time period, preferably in the presence of 1 to 100 mole % of the amount required therefor. The time period for the reaction ranges from 5 min. to 24 hours at room temperature to 200° C. Then the precondensed and the non-precondensed components are subsequently combined and then, after the addition of more water and, optionally, more solvent, the method proceeds as described above.

A still further feature of the invention resides in use of the aminoalkyl-substituted organopolysiloxane thiourea derivatives as described above for the removal of dissolved metals from aqueous or organic phases.

DETAILED DESCRIPTION OF INVENTION

Special advantages as regards the availability of the initial materials and the material qualities were achieved with polymers in which the units according to formula II represent a group of the formula:

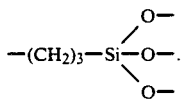

In principle, instead of the alkoxysilyl compounds, the corresponding halogenide or phenoxy compounds can also be used as initial materials for the method as described herein. However, their use offers no advantages but rather can cause problems, as for example, in the case of the chlorides, due to the hydrochloric acid released during the hydrolysis.

The hydrolysis of the initial materials and optional cross-linking agents must be carried out in a solvent which is largely water-miscible but dissolves the initial materials. Alcohols are preferably used for this purpose which correspond to the alkoxy groupings on the monomeric precursors of the initial materials or on the metal atoms of the optionally used cross-linking agents. Linear or branched lower alcohols with 1 to 5 C atoms such as methanol, ethanol, n- and i-propanol, n- and i-butanol or n-pentanol, alone or in mixtures are especially suitable. Instead of alcohols, other polar solvents which are largely water-miscible can also be used; however, this turns out not to be as advantageous for engineering reasons on account of the solvent mixtures which arise as a result of the alcohol being split off hydrolytically.

The hydrolysis is preferably carried out with an excess of water above the amount that is stoichiometrically required. The amount of water necessary for the hydrolysis in practice depends on the hydrolysis speed of the particular monomer used in such a manner that as the amount of water increases and at higher temperatures, a more rapid hydrolysis occurs. However, an upper limit can be set by separation which occurs and by the formation of a two-phase system. A hydrolysis in homogenous solution is preferred.

The polycondensation process itself can be carried out at various temperatures. Since the polycondensation takes place most rapidly at rather high temperatures, it is simplest to allow it to take place at reflux temperature or just thereunder. In principle, the hydrolysis and/or polycondensation can also be carried out at higher temperatures, that is, under pressure.

The reaction mixture can solidify to a solid mass during the polycondensation. It is appropriate for this reason to add an appropriate amount of solvent or water for dilution. The solvent will generally be the same thereby which was already used in the hydrolysis of the silanes, that is, a lower alcohol with 1 to 5 C atoms is preferably used. Whether water or a solvent is added for dilution in the individual instance also depends on which physical qualities the organopolysiloxane to be prepared should have.

The duration and the temperature of the post reaction, which can last up to 48 hours, can also influence this. As a rule, a postreaction at a rather high temperature results in an increase of the mechanical stability and in a strengthened structure of the formed product.

The separation of the formed product can take place n accordance with conventional techniques such as filtering, decanting or centrifuging or also by distilling off the liquid phase. The washing of the formed solid is preferably carried out with the solvent used in the precipitation or with water. The measure of tempering often proves to be logical as regards the elevation of the physical stability of the polycondensates.

The dried and/or tempered product can be classified according to size in customary devices in different particle sizes. Of the individual workup or finishing measures of washing, drying, tempering and classifying, the one or the other can be eliminated or can be carried out in a different sequence. A classification can also be carried out, for example, with moist product which was optionally previously dried or tempered.

The duration of the hydrolysis is a function of the tendency to hydrolyze of initial material according to formula and/or of cross-linking agents according to formula VII. The readiness to hydrolyze and therewith the hydrolysis speed depends in particular on the type of alkoxy groups in silicon position or titanium, zirconium or aluminum position, whereby the methoxy group hydrolyzes the most rapidly and a deceleration occurs with increasing chain length or with increasing branching.

Hydrolysis and polycondensation can be accelerated by the addition of bases such as e.g. ammonia or also of acids such as e.g. HCl, but also by using a current condensation catalyst such as e.g. dibutyl tin diacetate.

In order to compensate a different hydrolysis and polycondensation behavior of the silane monomers according to formula V and of the cross-linking component according to formula VII, the monomers can be precondensed at first in accordance with a preferred preparation variant of the invention.

To this end, the silane according to formula V and the cross-linking agent or agents according to formula VII are precondensed with or without using a solvent, e.g. using an alcohol corresponding to the alkoxy groups with 1 to 5 C atoms in the presence of an amount of water not sufficient for total hydrolysis within the set precondensation time, preferably in the presence of 1 to 100 mole % of the amount required for this, over a time period of 5 minutes up to 72 hours at room temperature to 200° C. and then, after the addition of more water and, optionally, more organic solvent, the complete hydrolysis and condensation are carried out.

In order to favor this precondensation effect, another condensation catalyst of the previously mentioned type can be added thereby. Ammonia, hydrochloric acid, acetic acid or phosphoric acid are used with preference. After completed precondensation, the entire hydrolysis and polycondensation are carried out as described. The precondensation can naturally also be carried out under a pressure which corresponds to the sum of the partial pressures of the reaction components.

In the case of special applications or specially desired physical qualities of the cross-linked, aminoalkyl-substituted organopolysiloxane thiourea derivatives of the invention, it can be advantageous according to a further preparation variant of the invention to precondense the monomeric component according to formula V and the cross-linking agent or agents according to formula VII independently of each other. This procedure results in the formation of polymers in which the polymer units of formulas I and IV are present in the form of blocks. This method provides that a silane component of formula V and the cross-linking agent or agents of formula VII are precondensed independently of each other with or without using a solvent, e.g. using an alcohol corresponding to the alkoxy groups with 1 to 5 C atoms in the presence of an amount of water not sufficient for total hydrolysis within the set precondensation time, preferably in the presence of 1 to 100 mole % of the amount required for this, over a time period of 5 minutes up to 72 hours at room temperature to 200° C. and subsequently the precondensed components are combined and then the complete hydrolysis and condensation are carried out as described. Naturally, one of the described precondensation catalysts can also be used again in this precondensation or the precondensation can be carried out under pressure.

According to a further preparation variant of the invention, products are obtained in which the polymer units of formulas I and IV are partially present in the form of blocks, that is, according to this variant, at least one monomeric component according to formula V or VII is always precondensed as described above and at least one monomeric component according to formula V or VII is not precondensed. Subsequently, precondensed and non-precondensed components are combined with each other and, after the addition of more water as well as, optionally, more solvent, the entire hydrolysis and polycondensation of the entire mixture are carried out as described above. The further treatment of the polycondensate formed thereby follows the other methods of the invention.

The new, substituted organopolysiloxane thiourea derivatives are characterized in particular by the quantitative hydrolysis yields, the elementary analyses and by their chemical behavior. Purely optically speaking, there is no difference between the copolycondensates obtained according to the different methods of preparation described herein. Depending on the pretreatment, the polymers of the invention exhibit surfaces of 0.1 to 1200 $m^2/g$ and particle size diameters of approximately 1 cm to 1 $\mu$m. A preferred article size range can be readily adjusted thereby.

The decomposition points for the new polymeric thioureas are naturally different. In general, however, they are distinctly above 100° C. in air and above 150° C. under an atmosphere of protective gas.

Further important subject matter of the invention resides in the use of the polymeric thiourea derivatives of the invention for the removal of dissolved metals from a liquid, aqueous or organic phase according to the static or the dynamic principle. Suspensions of the polymeric thioureas in aqueous or non-aqueous (e.g. Alcoholic) medium are agitated with metals or their melts for a sufficient time to extract the metal in substantial amount. Of course, the polymeric thioureas exhibit comparable affinities to the different metals thereby as do monomeric soluble thioureas of comparable structure.

The invention is explained in more detail in the following with reference made to examples of embodiments.

EXAMPLE 1

291.99 g (0.5 mole) of the aminoalkyl-substituted thiourea

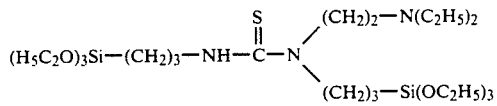

were dissolved in 300 ml ethanol. The solution was heated in a 2-liter three-neck flask with KPG agitator, reflux condenser and drop funnel to reflux temperature and compounded in the boiling heat with 100 ml $H_2O$. The mixture was agitated further under reflux until the start of gelling after approximately 0.5 h. The solid formed was diluted with 400 ml ethanol, then agitated 1 hour more under reflux, filtered off via a vacuum nutsche after the mixture had cooled down, washed with 2×200 ml ethanol and dried 20 h at 100° C. in a drying cupboard. The polymeric urea present partially in the form of powder and partially in the form of lumps was ground 2 hours further in a ball mill and then weighed out. 179.3 g (99.2 % of theory) polymeric product were obtained consisting of polymer units of the formula:

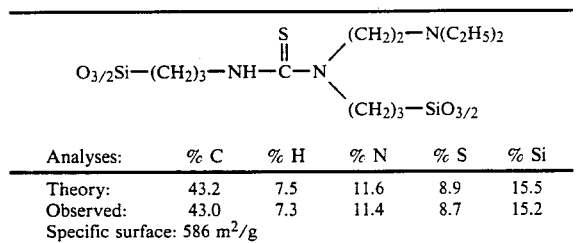

| Analyses: | % C | % H | % N | % S | % Si |
|---|---|---|---|---|---|
| Theory: | 43.2 | 7.5 | 11.6 | 8.9 | 15.5 |
| Observed: | 43.0 | 7.3 | 11.4 | 8.7 | 15.2 |

Specific surface: 586 m²/g

Specific surface: 586 m²/g

EXAMPLE 2

Starting with 171.0 g (0.3 mole) of the substituted thiourea of the formula

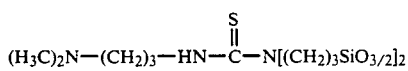

100.9 g (98.8% of theory) of a substituted polymeric urea were obtained in analogy with example 1 which consisted of polymer units of the formula:

in a grain size of 30 μm to 100 μm.

| Analyses: | % C | % H | % N | % S | % Si |
|---|---|---|---|---|---|
| Theory: | 41.5 | 7.3 | 12.1 | 9.2 | 16.2 |
| Observed: | 40.2 | 6.7 | 12.3 | 9.3 | 15.8 |

Specific surface: 623 m²/g

EXAMPLE 3

59.1 g (0.2 mole) of the substituted thiourea derivative

and 208.3 g (1.0 mole) Si(OC₂H₅)₄ were dissolved in 300 ml methanol. The solution was compounded in a 2-liter three-neck flask with KPG agitator and reflux cooler with 150 ml desalinated water, heated to reflux temperature and agitated 15 min. at this temperature. The solution was then cooled down again to room temperature and agitated until the start of gelling. The suspension formed was compounded with 15 ml 10% solution of NH₃, then transferred into an autoclave and agitated further for 24 h at 160° C. The mixture was cooled off, the solid formed filtered off, washed with 2×200 ml water and dried 24 h at 130° C. as well as tempered 24 h at 180° C. under an atmosphere of N₂. 103.6 g (98.3% of theory) of an aminopropyl-substituted polymeric thiourea were obtained consisting of polymer units of the formula:

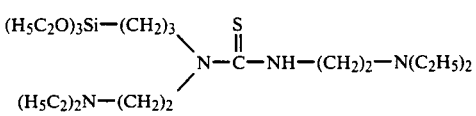

| Analyses: | % C | % H | % N | % S | % Si |
|---|---|---|---|---|---|
| Theory: | 16.0 | 3.1 | 8.0 | 6.1 | 32.0 |
| Observed: | 16.2 | 3.4 | 7.9 | 6.3 | 31.7 |

Specific surface: 786 m²/g

EXAMPLE 4

191.5 g (0.4 mole) of the substituted thiourea of the formula:

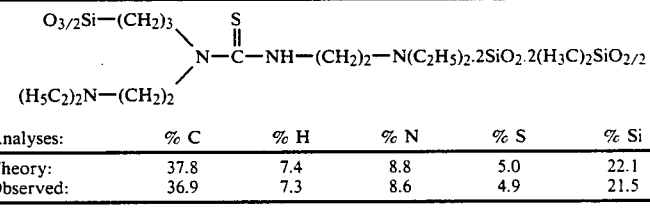

166.7 g (0.8 mole) Si(OC₂H₅)₄ and 118.6 g (0.8 mole) (H₃C)₂Si(OC₂H₅)₂ were dissolved in 500 ml isopropanol. The clear solution was compounded with 15 ml desalinated water and heated in a 4-liter three-neck flask with KPG agitator and -reflux condenser to reflux temperature. The mixture was agitated 5 h at first under reflux, then another 120 ml water added and the mixture agitated further until the start of gelling. The gel formed was diluted with 300 ml isopropanol and agitated 3 h more under reflux The mixture was cooled down, the solid formed filtered off from the liquid phase, washed with isopropanol and dried 24 h at 130° C. under an atmosphere of N₂. 248.6 g (97.7 % of theory) polymeric product were obtained consisting of polymer units of the formula:

$$O_{3/2}Si-(CH_2)_3 \diagdown N-\overset{S}{\underset{\|}{C}}-NH-(CH_2)_2-N(C_2H_5)_2 \cdot 2SiO_2 \cdot 2(H_3C)_2SiO_{2/2}$$
$$(H_5C_2)_2N-(CH_2)_2 \diagup$$

| Analyses: | % C | % H | % N | % S | % Si |
|---|---|---|---|---|---|
| Theory: | 37.8 | 7.4 | 8.8 | 5.0 | 22.1 |
| Observed: | 36.9 | 7.3 | 8.6 | 4.9 | 21.5 |

Specific surface: 186 m²/g

EXAMPLE 5

194.3 g (0.4 mole) of the substituted thiourea derivative

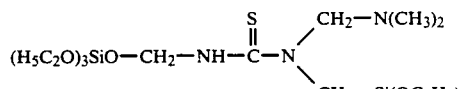

were combined in 300 ml ethanol with 39.7 g (0.2 mole) C₆H₅—Si(OCH₃)₃ which had previously been precondensed in the presence of 1 ml 0.1 n aqueous solution of HCl. After the addition of 100 ml H₂O, heating to reflux temperature and after following further a method analogous to example 1, 130.0 g (99.0) of theory) polymeric product were obtained with a grain size of 30 μm to 100 μm consisting of polymer units of the formula:

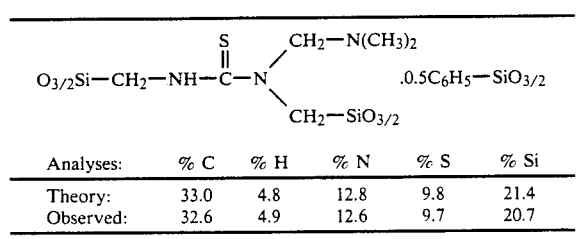

| Analyses: | % C | % H | % N | % S | % Si |
|---|---|---|---|---|---|
| Theory: | 33.0 | 4.8 | 12.8 | 9.8 | 21.4 |
| Observed: | 32.6 | 4.9 | 12.6 | 9.7 | 20.7 |

Specific surface, 186 m²/g

EXAMPLE 6

224.9 g (0.5 mole) of the substituted thiourea derivative

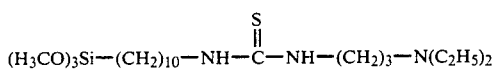

were compounded with 5 ml aqueous 2% solution of NH₃ and agitated 5 h at 80° C. Parallel thereto, 268.3 g (1.0 mole) i-C₃H₇Ti(OC₃H₇)₃ was compounded with 5 ml aqueous 0.1 n solution of HCl and agitated 2 h at 80° C. After termination of the precondensation, both components were combined in 500 ml isopropanol, heated to reflux temperature and compounded with 150 ml H₂O. Gel formation began during the reflux phase. The mixture was diluted with 300 ml water and agitated 2 h longer under reflux, then worked up analogously to example 4.

607.2 g (99.4% of theory) polymeric product were obtained consisting of polymer units of the formula:

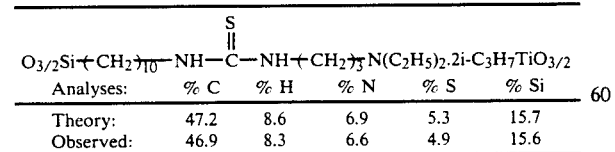

| Analyses: | % C | % H | % N | % S | % Si |
|---|---|---|---|---|---|
| Theory: | 47.2 | 8.6 | 6.9 | 5.3 | 15.7 |
| Observed: | 46.9 | 8.3 | 6.6 | 4.9 | 15.6 |

Specific surface: 72 m²/g

EXAMPLE 7

204.3 g (0.5 mole) of the substituted thiourea derivative

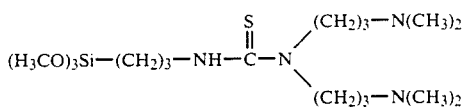

152.2 g (1.0 mole) Si(OCH₃)₄ and 24.6 g (0.1 mole) Al(OC₄H₉)₃ were combined with each other. The mixture was compounded with 5 ml 5% aqueous solution of NH₃ and agitated 3 h at 80° C. Then 300 ml methanol and 80 ml water were added and the mixture agitated 2 h more under reflux. After a workup analogous to example 4. 231.4 g (98.5% of theory) polymeric product were obtained consisting of polymer units of the formula:

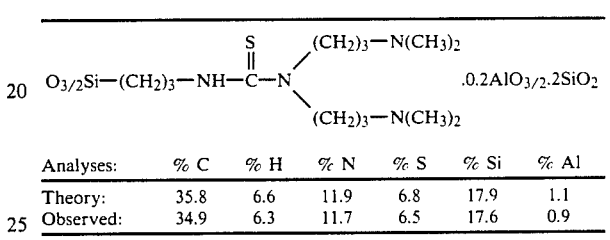

| Analyses: | % C | % H | % N | % S | % Si | % Al |
|---|---|---|---|---|---|---|
| Theory: | 35.8 | 6.6 | 11.9 | 6.8 | 17.9 | 1.1 |
| Observed: | 34.9 | 6.3 | 11.7 | 6.5 | 17.6 | 0.9 |

Specific surface: 253 m²/g

EXAMPLE 8

159.5 g (0.25 mole) of the substituted thiourea derivative of the formula

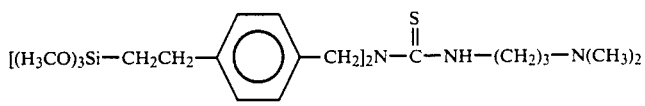

and 19.2 g (0.05 mole) Zr(OC₄H₉)₄ were precondensed analogously to example 7 with 5 ml 5% aqueous solution of NH₃, then completely hydrolysed, condensed and worked up. 129.6 g (98.9% of theory) polymeric product were obtained consisting of polymer units of the formula:

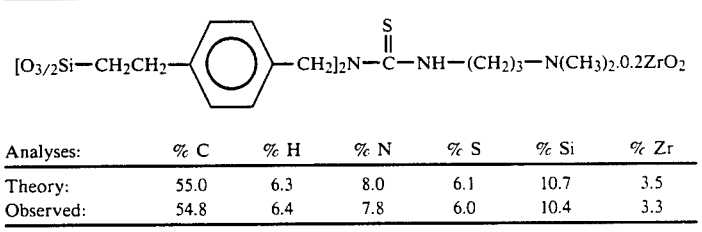

| Analyses: | % C | % H | % N | % S | % Si | % Zr |
|---|---|---|---|---|---|---|
| Theory: | 55.0 | 6.3 | 8.0 | 6.1 | 10.7 | 3.5 |
| Observed: | 54.8 | 6.4 | 7.8 | 6.0 | 10.4 | 3.3 |

Specific surface: 25 m²/g

EXAMPLE 9

5 g of the aminoalkyl-substituted organopolysiloxane thiourea prepared according to example 1 were suspended in 100 ml water in which 20 mg palladium were dissolved in the form Na₂PdCl₄. The suspension was agitated 1 hour at room temperature and then the solid was filtered off. An analysis of the filtrate showed a residual Pd content in the solution of less than 0.05 mg.

EXAMPLE 10

5 g of the polymeric thiourea prepared according to example 4 were suspended in 100 ml ethanol in which 50 mg rhodium were dissolved in the form of rhodium acetate. The suspension was agitated 2 hours under reflux, then the solid filtered off from the liquid phase and washed with a total of 50 ml ethanol. An analysis of the filtrate plus wash solution showed a residual rhodium content of 0.1 mg.

EXAMPLE 11

5 g of the polymeric thiourea prepared according to example 2 were suspended 1 hour in 100 ml water in which 5 mg lead were dissolved in the form of lead acetate. After a treatment of the suspension analogous to the treatment in example 10, 0.05 mg lead remained in solution.

EXAMPLE 12

10 g of the thiourea prepared according to example 7 with a grain size of 0.1 to 0.5 mm were transferred into a column with an inner diameter of 15 mm. The column was loaded within 1 hour with 200 ml water in which 20 mg Ag were dissolved in the form of $AgNO_3$. It was rewashed with 300 ml $H_2O$ and the wash water combined with the solution passed through. An analysis of the entire solution showed a residual silver content of 0.01 mg.

Further variations and modifications of the foregoing will be apparent to those skilled in the art and are intended to be encompassed by the claims appended hereto.

We claim:

1. An aminoalkyl-substituted organopolysiloxane thiourea composed of units of the formula:

$$\begin{array}{c} R^1 \\ \phantom{R^1}\diagdown \\ \phantom{R^1}\phantom{\diagdown} N-\underset{\underset{S}{\|}}{C}-N \\ \phantom{R^1}\diagup\phantom{xxxxxxxx}\diagdown \\ R^2 \phantom{xxxxxxxxx} R^4 \end{array} \quad (I)$$

wherein $R^1$ for a group of the formula:

$$R^5-Si\begin{array}{c}O-\\ \phantom{}O-\\ O-\end{array} \quad (II)$$

in which $R^5$ is bonded to nitrogen in formula I and is alkylene with 1 to 10 C atoms or cycloalkylene with 5 to 8 C atoms or a group of the formula:

—(CH$_2$)$_n$—⟨cyclohexyl with H⟩—(CH$_2$)$_m$— or

—(CH$_2$)$_n$—⟨phenyl⟩—(CH$_2$)$_m$— with n=1–6 (bonded to the nitrogen)

m=0–6 (bonded to the silicon), whereby $R^2$ has the same meaning as $R^1$ or is H, $R^3$ has the same meaning as $R^1$ or is H or a group of the formula:

$$-(CH_2)_n-N(R^6)_2 \quad (III)$$

in which n=1–6 and $R^6$ is equal to H or is a linear or branched alkyl group with 1 to 5 C atoms, $R^4$ is H or a group of the formula (III), and at most 2 groups of formula (II) and at most 2 groups of formula (III) are contained in the polymer unit according to formula (I), and the free valences of the oxygen atoms bound to the silicon atom are saturated as in silica skeletons by silicon atoms of further groups of formula (II) and/or via the metal atoms in one or more cross-linking bridge-type cross links:

$$\begin{array}{c} | \\ O \\ | \\ -M-O- \\ | \\ O \\ | \end{array} \quad \text{or} \quad \begin{array}{c} R' \\ | \\ -M-O- \\ | \\ O \\ | \end{array} \quad \text{or} \quad \begin{array}{c} R' \\ | \\ -M-O- \\ | \\ R' \end{array} \quad (IV)$$

or $$-Al\begin{array}{c}O-\\\diagup\\\diagdown\\O-\end{array} \quad \text{or} \quad -Al\begin{array}{c}O-\\\diagup\\\diagdown\\R'\end{array} \quad (IV)$$

whereby M is a silicon, titanium or zirconium atom and R' a phenyl group or a linear or branched alkyl group with 1 to 5 C atoms and the ratio of the silicon atoms from the groups of formula (II) to the metal atoms in the bridge-type cross links of formula (IV) is 1:0 to 1:20.

2. The aminoalkyl-substituted organopolysiloxane thiourea according to claim 1, wherein said thiourea is a random copolycondensate, block copolycondensate or mixed copolycondensate.

3. The aminoalkyl-substituted organopolysiloxane thiourea according to claim 1 wherein $R^1$ is $$-(CH_2)_3-Si\begin{array}{c}O-\\\diagup\\\diagdown\\O-\end{array}O-.$$

4. The method of preparing an aminoalkyl-substituted organopolysiloxane thiourea having the formula:

$$\begin{array}{c} R^1 \\ \phantom{R^1}\diagdown \\ \phantom{R^1}\phantom{\diagdown} N-\underset{\underset{S}{\|}}{C}-N \\ \phantom{R^1}\diagup\phantom{xxxxxxxx}\diagdown \\ R^2 \phantom{xxxxxxxxx} R^4 \end{array} \quad (I)$$

in which $R^1$, $R^2$, $R^3$ and $R^4$ and have the same meaning as in claim 12 by a hydrolysis and condensation reaction comprising dissolving in a solvent a monomeric aminoalkyl-substituted thiourea of the formula:

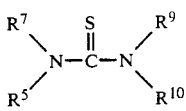

in which
R⁷ is a group of the formula $$-R^5-Si(OR^{11})_3 \quad (VI)$$

and R⁵ is bonded to nitrogen and is alkylene with 1 to 10 C atoms or cycloalkylene with 5 to 8 C atoms or a group of the formula:

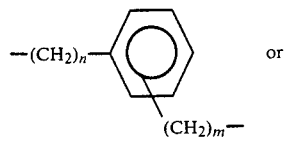

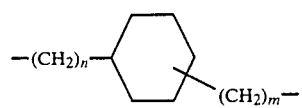

with
n = 1-6 (bonded to the nitrogen)
m = 0-6 (bonded to the silicon)
R¹¹ is a linear or branched alkyl group with 1 to 5 C atoms,
R⁸ has the same meaning as R⁷ or is H,
R⁹ has the same meaning as R⁷ or is H or a group of the formula (III):

$$-(CH_2)_n-N(R^6)_2 \quad (III)$$

R¹⁰ is H or a group of formula (III) and at most 2 groups of formula (VI) and at most 2 groups of formula (III) are contained in the monomeric thioureas of formula (V),
optionally adding at least one cross-linking agent of the formula:

$$M(OR)_{2-4}R'_{0-2} \text{ or } M(OR)_{2-3} R'_{0-1} \quad (VII)$$

in which is a silicon, titanium, zirconium or aluminum atom, R' a linear or branched alkyl with 1 to 5 C atoms or a phenyl group and R signifies a linear or branched alkyl group with 1 to 5 C atoms, where the ratio of the silicon atoms of the groups of the formula (VI) to the metal atoms of formula (VII) is 1:0 to 1:20,
said solvent being largely water-miscible but capable of dissolving the substituted thiourea of formula (V) and cross-linking agents according to formula (VII), adding on amount of water which is at least sufficient for the complete hydrolysis and condensation of the resulting solution under agitation, gelling the resulting reaction mixture under further agitation at a temperature in the range of room temperature to 200° C., further agitating the resulting solid formed in gelation, optionally after adding more water-miscible solvent or water, for up to 48 hours at room temperature up to 200° C., separating the polycondensate thus formed from the liquid phase, optionally washing, drying at room temperature to 250° C., optionally under an atmosphere of protective gas or in a vacuum, optionally tempering 1 to 100 hours at temperatures of 130° C. to 300° C. in air, under an atmosphere of protective gas or in a vacuum, optionally grinding and/or classifying according to size.

5. The method according to claim 4, wherein methanol, ethanol, n- and i-propanol, n- and i-butanol or n-pentanol are used alone or in a mixture as solvent in the hydrolysis.

6. The method according to claim 4, wherein the hydrolysis is carried out with an excess of water.

7. The method of preparing a organopolysiloxane thiourea according to claim 4, wherein the monomer according to formula (V) and the cross-linking agent or agents according to formula (VII) are precondensed together in a precondensation reaction with or without a solvent in the presence of an amount of water which is not sufficient for the complete hydrolysis.

8. The method according to claim 7 wherein the amount of water added is from 1 to 100 mole % of the amount of water required for the hydrolysis.

9. The method according to claim 7 wherein the precondensation reaction takes place over a period of 5 min. to 72 hours at room temperature to 200° C., optionally with the addition of a condensation catalyst.

10. The method according to claim 7 further comprising adding more water and, optionally, more solvent to complete the condensation to thereby form a cross-linked thiourea.

11. The method of preparing an organopolysiloxane thiourea according to claim 4, wherein the monomeric component according to formula (V) and the cross-linking agent or agents according to formula (VII) are precondensed independently of each other in a precondensation reaction for 5 min. to 72 hours with or without using a solvent in the presence of an amount of water which is not sufficient for the complete hydrolysis.

12. The method according to claim 11 wherein the amount of water added is from 1 to 100 mole % of the amount of water required for the hydrolysis.

13. The method according to claim 11 wherein the temperature is from room temperature to 200° C., optionally under the addition of a condensation catalyst, and thereafter combining the precondensed components and after adding more water and, optionally more solvent, to thereby form said organopolysiloxane thiourea.

14. The method of preparing an organopolysiloxane thiourea according to claim 4, wherein the monomeric component according to formula (V) or the cross-linking agent or agents according to formula (VII) are precondensed with or without a solvent in the presence of an amount of water which is not sufficient for the complete hydrolysis over a time period of 5 min. to 24 hours at room temperature to 200° C., thereafter combining the precondensed and the non-precondensed components and after adding more water and, optionally, more solvent, to thereby form said organopolysiloxane thiourea.

* * * * *